(12) United States Patent
Vlad

(10) Patent No.: US 7,023,100 B2
(45) Date of Patent: Apr. 4, 2006

(54) METHOD AND APPARATUS FOR CONVERSION OF MOVEMENT TO ELECTRICAL ENERGY

(75) Inventor: Vladimir Vlad, West Des Moines, IA (US)

(73) Assignee: Glycon Technologies, L.L.C., Ames, IA (US)

( * ) Notice: Subject to any disclaimer, the term of this patent is extended or adjusted under 35 U.S.C. 154(b) by 68 days.

(21) Appl. No.: 10/736,352

(22) Filed: Dec. 15, 2003

(65) Prior Publication Data

US 2005/0127676 A1    Jun. 16, 2005

(51) Int. Cl.
*H01L 41/08* (2006.01)
(52) U.S. Cl. .................. 290/1 R; 290/1 A; 310/800; 310/339; 310/309; 152/152.1
(58) Field of Classification Search ........... 290/1 R, 290/1 A, 40; 322/3; 310/800, 339, 309; 152/152.1
See application file for complete search history.

(56) References Cited

U.S. PATENT DOCUMENTS

| | | | |
|---|---|---|---|
| 4,504,761 A * | 3/1985 | Triplett | 310/339 |
| 4,654,546 A | 3/1987 | Kirjavainen | |
| 6,438,193 B1 * | 8/2002 | Ko et al. | 377/24.1 |
| 6,438,957 B1 * | 8/2002 | Goldman | 60/641.8 |
| 6,470,933 B1 * | 10/2002 | Volpi | 152/152.1 |
| 6,847,126 B1 * | 1/2005 | Adamson et al. | 290/1 R |
| 6,864,606 B1 * | 5/2005 | Rose | 310/74 |
| 2003/0073936 A1 | 4/2003 | Raisanen | |

* cited by examiner

*Primary Examiner*—Darren Schuberg
*Assistant Examiner*—Iraj A. Mohandesi
(74) *Attorney, Agent, or Firm*—McKee, Voorhees & Sease, P.L.C.

(57) ABSTRACT

The present invention includes apparatus and methods for powering movement of a structure by generating electricity from movement. In one aspect of the invention, electricity is generated from changes in thickness of a pad integrated into a tire. The tire can include a tire body having an outer wall and opposite sidewalls, a plurality of radial plies, and at least one pad integrated between the radial plies.

7 Claims, 3 Drawing Sheets

METHOD AND APPARATUS FOR CONVERSION OF MOVEMENT TO ELECTRICAL ENERGY

BACKGROUND OF THE INVENTION

The present invention relates to energy conversion. More specifically, although not exclusively, the present invention relates to a converting rotational movement of a structure, such as a tire, into electrical energy. The electrical energy can then be used to cause additional rotation or movement.

Although not the only application to the present invention, one aspect of the invention relates to problems associated with electric powered cars. Different approaches to the problem have been attempted, but significant problems remain, including lack of suitable light for solar cars, lack of cost effectiveness, and lack of efficiency.

Another problem addressed by the present invention relates to the use of piezoelectric sensors. Although piezoelectric sensors have been used in various applications to convert strain into a voltage, there are difficulties in using piezoelectrics in producing electrical energy.

Therefore, it is a primary objective, feature, or advantage of the present invention to provide a method and apparatus for converting rotational movement of a structure into electrical energy.

It is further objective, feature, or advantage of the present invention to provide a method and apparatus for converting rotational movement of a structure into electrical energy that is economical and efficient.

It is a still further objective, feature, or advantage of the present invention to provide a method and apparatus for converting movement of a structure into electrical energy that does not require piezoelectric elements.

These and/or other objectives, features, or advantages of the present invention will become apparent from the specification and claims that follow.

SUMMARY OF THE INVENTION

The present invention relates to the generation of electrical energy from mechanical movement. According to one aspect of the present invention, a method for providing movement of a structure is disclosed. The method includes moving a structure to generate a force against a material. The material includes one or more layers and one or more voids between the layers. The force causes a reduction of the thickness of the material and generates a resulting charge. The charge is then used to power subsequent movement of the structure. The material is preferably made of a polyolefin layered material or other appropriate electromechanical film. The material can be a fabric material. According to another aspect of the present invention, the structure can be a tire. The tire can be made of radial plys and the material can be integrated between the radial plys.

According to another aspect of the present invention, an apparatus for converting rotational movement against a surface into electrical energy is disclosed. The apparatus includes a tire body, the tire body having an outer wall for contact with the surface and opposite side walls. The tire body includes a plurality of radial plys. There is at least one pad integrated between the radial plys.

According to another aspect of the present invention, a vehicle is provided. The vehicle includes a vehicle body, a plurality of wheels operatively connected to the vehicle body. Mounted on at least one of the wheels is a tire body having an outer wall and opposite side walls. The tire body also has a plurality of radial plys, at least one pad integrated between radial plys for converting force against the tire associated with movement of the tire into electrical energy. The vehicle also includes an electrical system operatively connected to the pad for collecting and dispensing electrical energy.

DETAILED DESCRIPTION OF THE PREFERRED EMBODIMENT

The present invention provides for devices and methods for generating electrical energy from movement. This includes generating energy from rotational movement. A preferred embodiment is for generating electrical energy from rotational movement of a tire is described herein. The present invention, however, is not to be limited to this preferred embodiment, as the present invention contemplates numerous variations in specific structure, materials, methodology, implementation, and application.

Figure 1:
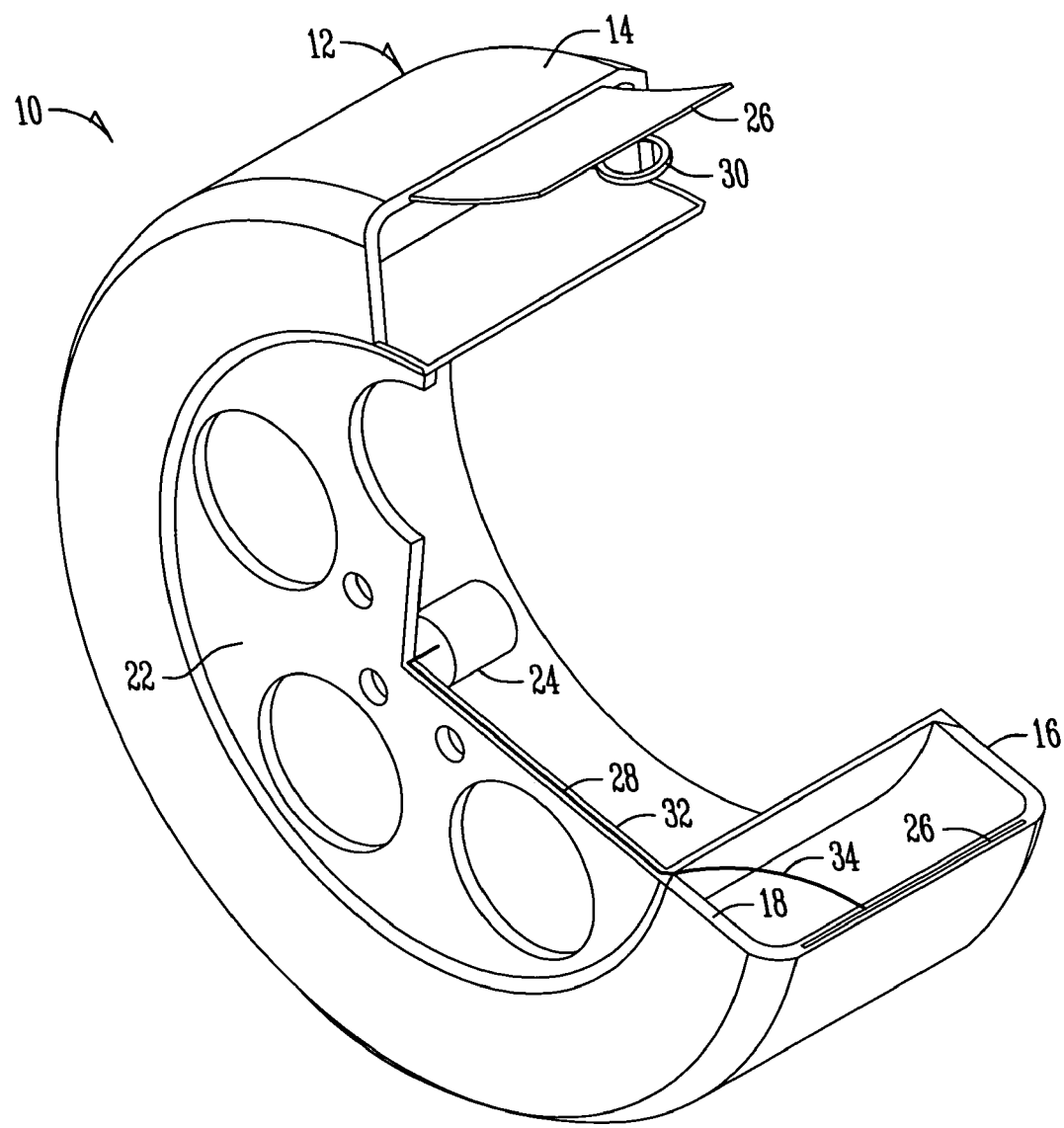
FIG. 1 is a partial sectional view of one embodiment of the present invention showing a tire and wheel configured for generating electricity.

FIG. 1 illustrates one embodiment of an electricity generating tire of the present invention. In FIG. 1, the tire 10 has a tire body 12 with an outer wall 14 that comes into contact with a surface as the tire can rotate. The tire body 12 also has a first side wall 16 and an opposite side wall 18. The tire body 12 is formed from a plurality of radial plys. Integrated into the radial plys is a pad 26. Preferably the pad 26 is formed from a plurality of layers. There is an insertion ring 30 attached to the pad 26 which provides for convenient insertion of the pad 26 between radial plys of the tire 12.

The tire 12 is mounted on a wheel 22. The wheel 22 has a hub 24. There are current transfer cables 28 running to within the hub 24 where a circuit can be disposed. Such a circuit can include an operational amplifier configured to amplify the received current. In addition, the circuit can convert the AC voltage into DC voltage. The current transfer cables 28 preferably run through a trench 32 in the rim. The trench 32 in the rim protects the current transfer cables 28. The present invention contemplates that other forms of protection can also be used. There is a pad-to-rim current transfer wire 34 that connects the pad 26 to the current transfer cable 28. This configuration is merely one configuration that can be used. The present invention contemplates other variations.

As the tire 12 rotates against a surface, electrical current is generated through the pressure and motion applied by the vehicle on the pad 26. Preferably, the pad 26 comprises an electromechanical film. The pad generates AC electrical current whenever pressure is applied. The mass of the vehicle exerts a pressure on the tires, hence pressure on the pad.

It is preferred that the pad be formed from a polymeric film, such as the polyolefin film that is available from EmfiTech Ltd., located at Konttisentie 8, 40800 Vaajakoski, Finland. The polyolefin film sensors are a thin, biaxially oriented plastic compound. This biaxial orientation produces microscopic lens-like gas bubbles and voids in the material. The size of these voids doubles during the high-pressure gas injection process that the sensors are subject to. Appropriate charging in a high voltage electrostatic field causes partial discharges inside the voids and permanent charges to be generated in the structure. Unlike piezoelectric sensors, the polymeric film responds to changes in thickness as opposed to changes in strain. In other words, these films are very sensitive to direct compression instead of bending. In contrast to the crystalline structure of piezo-sensors, these sensors have a permanent electric charge inside the cellular structure of the sensor core. Therefore, the weight of the vehicle has a more direct effect on the energy response of the polymeric film than would be the case with piezoelectrics, with there being less concern about the inflation of the tires, the road surface, and/or other variables.

According to the present invention, multiple polymeric film sensors are layered to form a pad or fabric. Forming such a pad is an improvement over prior art types of active arrays, because the pad or fabric can be more easily incorporated into any number of applications.

It is preferred that the pad 26 comprise a structure of ten layers of R-series ribbon sensors into the tire. By applying changing forces (F) on the tire and when the force/area (F/A) is in the linear region, the output voltage (V) is calculated as:

$$V = \left(\frac{1}{C}\right) * Sq * P,$$

where:

C is the total capacitance (pF/cm$^2$) of the sensor;

Sq is the sensitivity (pC/N)

When the force (F) is expressed as pressure, $$P = \frac{F}{A} \quad \left(\frac{N}{cm^2}\right)$$

Figure 2:
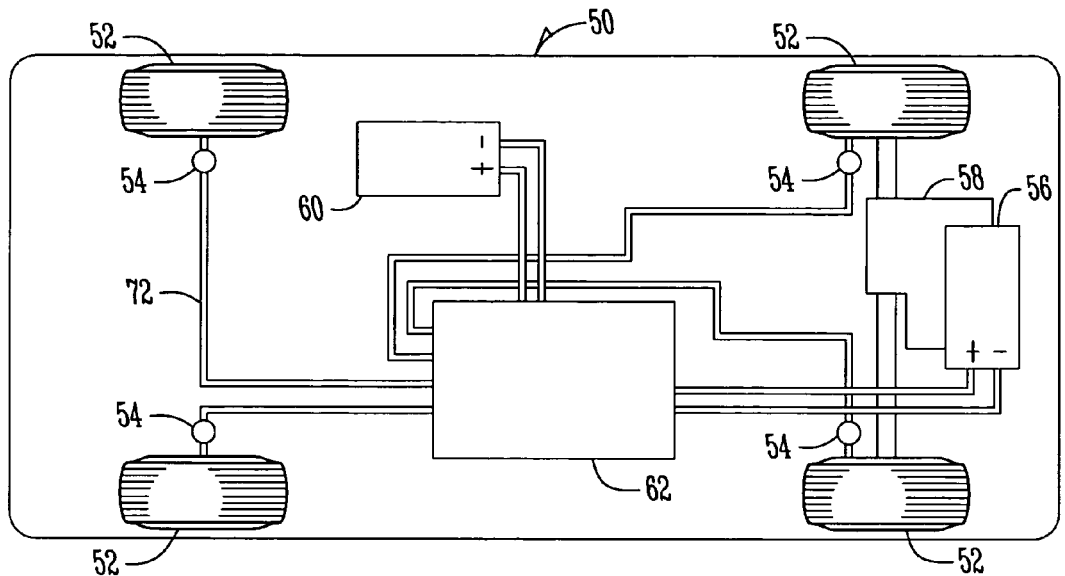
FIG. 2 is a top view of one embodiment of a vehicle according to the present invention.

FIG. 2 illustrates a top view of one embodiment of a vehicle according to the present invention. In FIG. 2, there is a vehicle 50. The vehicle 50 as shown has a plurality of tires 52. The tires 52 are electrically connected to current transfer cables 54 which are electrically connected to a main controlling unit 62 that can include a current amplifier. It should be appreciated that the voltage produced is at a relatively high level, certainly higher than the 12 volts normally associated with a vehicle battery. There is also a main battery 60 electrically connected to the control unit 62. An electric motor 58 is shown which can include a gear box and drive shafts 56. Preferably, the vehicle 50 uses a brush-type current pick-up system. It is to be understood that the present invention contemplates numerous types of electrical systems can be used as may be most appropriate for a particular application.

In the above described four-tire system, the theoretical voltage and current generated can be calculated. A car of 2,000 kg with a tire pressure of 2.2 bar and a speed of 60 km/h the voltage V generated by its tires in one second will be 38,720 (see table below).

| NO. | DATA | |
|---|---|---|
| 1 | CAR MASS kg | 2,000 |
| 2 | TIRE PRESSURE bar | 2.2 |
| 3 | CONTACT PATCH AREA cm2 | 227.3 |
| 4 | TIRE WIDE cm | 18 |
| 5 | CONTACT PATCH LENGTH cm | 12.63 |
| 6 | CAPACITANCE pF/cm2 | 30 |
| 7 | SENSITIVITY pC/N | 100 |
| 8 | VOLTAGE/CONTACT PATCH v | 7.333 |
| 9 | AMPERES/CONTACT PATCH a | 0.083 |
| 10 | VOLTAGE/E-TIRE v | 73.33 |
| 11 | AMPERES/E-TIRE a | .83 |
| 12 | VOLTAGE/CAR v | 293.3 |
| 13 | AMPERES/CAR a | 3.321 |
| 14 | CAR SPEED km/h | 60 |
| 15 | TIRE PERIMETER cm | 150 |
| 16 | TIRE SPINNING/SEC | 11.11 |
| 17 | CONTACT PATCHES/TIRE | 11.88 |
| 18 | CONTACT PATCHES/SEC | 132 |
| 19 | VOLTAGE/TIRE/SEC v | 968 |
| 20 | VOLTAGE/E-TIRE/SEC v | 9680 |
| 21 | VOLTAGE/CAR./SEC v | 38720 |

Figure 3:
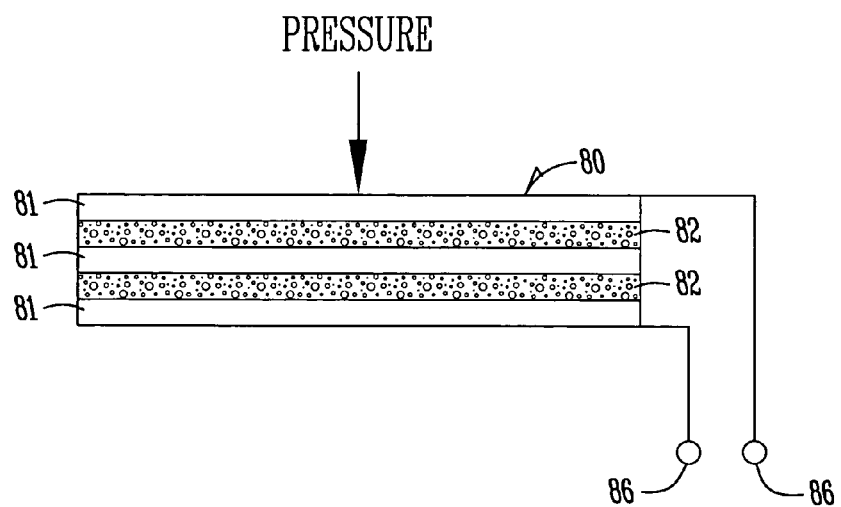
FIG. 3 is one embodiment of the methodology of generating electricity according to the present invention.

FIG. 3 is a pictorial representation showing the methodology of the present invention. In FIG. 3, pressure is exerted against a pad 80 resulting in a change in thickness of the layers 81 as they compress together due to voids 82 between the layers. This results in an electrical charge or voltage between nodes 84 and 86. Thus, electrical current is generated through the pressure and motion applied by the vehicle on the polymeric film pad introduced in the tire. The present invention can be used with any vehicle that relies on wheels for primary movement. The tire is fitted with a radial pad. The pad is preferably based on a polymeric film which generates AC electrical current whenever pressure is applied to it. The mass of the vehicle exerts pressure on the tires hence pressure on the pad. This in turn generates AC electrical current.

Through the constant rotation of the wheel, even flow of AC electrical current is generated. The amount of current generated is directly proportional to the ground contact patch area of the tire (where the vehicle mass and the tire pressure apply) and the velocity of the vehicle. An increased velocity results in increased tire rotations. The greater the vehicle's velocity, the more current generated. The resulting AC current is then transferred through a simple wiring system from the tire to the wheel where it is amplified and converted to DC and finally to the vehicle where it is to be controlled.

Figure 4:
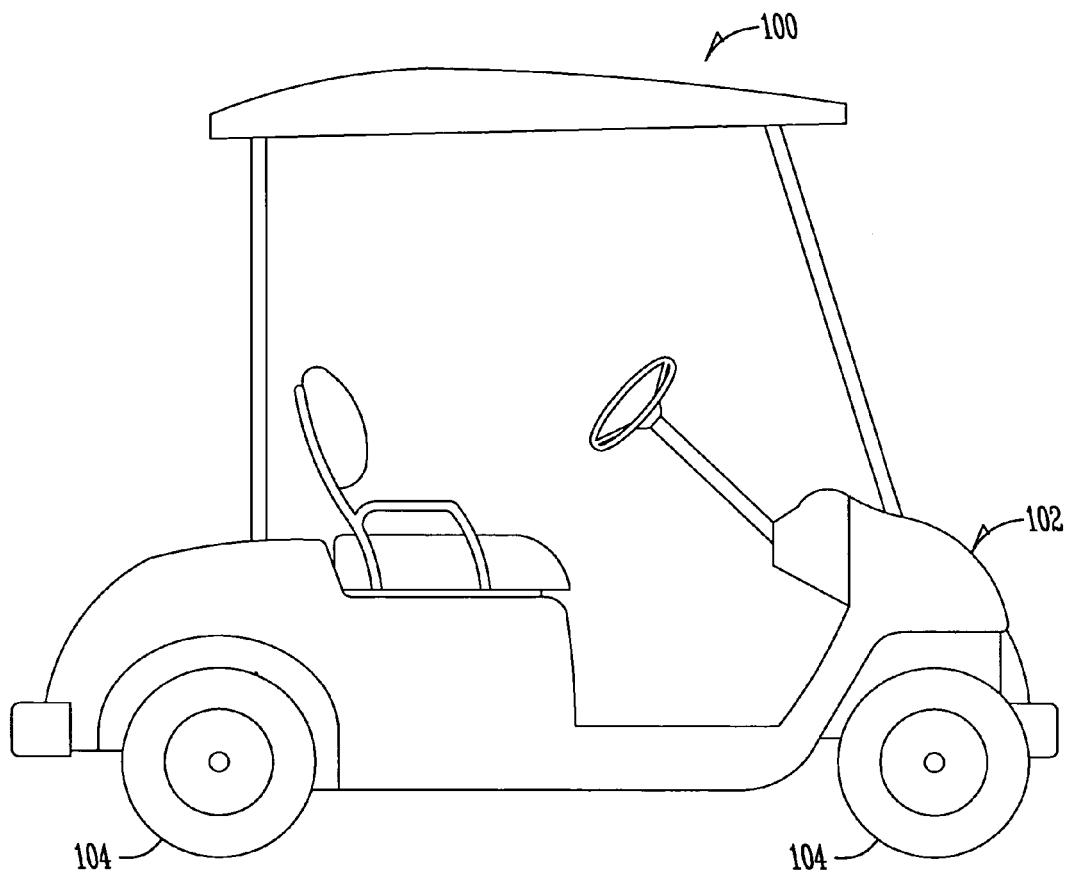
FIG. 4 is a side view of one example of a vehicle according to the present invention.

FIG. 4 illustrates another embodiment of the present invention. In FIG. 4, a vehicle 100 is shown. The vehicle shown is a golf cart. The golf cart includes a vehicle body 1 of 2 having a plurality of tires 104. The present invention provides for any number types of vehicles, the golf cart 100 shown in FIG. 4 is one variation. In addition to use in golf carts, the present invention contemplates use in other types of vehicles, including electric or hybrid cars, medical equipment such as wheelchairs or scooters, toys such as remote control cars, and other devices. It should be appreciated that any electric vehicle with tires can be retrofitted to use the tires of the present invention. In these and other applications, the energy generated from the tires need not be the only source of energy, although it is preferable that it is.

What is claimed is:

1. An apparatus for converting rotational movement against a surface into electrical energy, comprising:

a tire body;

the tire body having an outer wall for contact with the surface and opposite sidewalls;

the tire body comprising a plurality of radial plys;

at least one pad integrated between the radial plys to produce an electrical current as the outer wall of the tire body is in rotational movement against the surface; and wherein the pad comprises a ceramic material.

2. The apparatus of claim 1 further comprising a wheel associated with the tire body, the tire body mounted to the wheel.

3. The apparatus of claim 1 wherein the pad comprises a ceramic material.

4. An apparatus for converting rotational movement against a surface into electrical energy, comprising:

a tire body;

the tire body having an outer wall for contact with the surface and opposite sidewalls;

the tire body comprising a plurality of radial plys;

at least one pad integrated between the radial plys to produce an electrical current as the outer wall of the tire body is in rotational movement against the surface; and wherein the pad comprises a polymeric film material.

5. The apparatus of claim 1 wherein the pad comprises a plurality of layers and a plurality of voids between the layers.

6. The apparatus of claim 2 further comprising an electrical connection between each of the at least one pad and a circuit positioned on the wheel.

7. The apparatus of claim 6 wherein the circuit portion includes an operational amplifier.

* * * * *